United States Patent Office

2,857,252
Patented Oct. 21, 1958

2,857,252

PROCESS OF REACTING SODIUM SILICO-FLUORIDE WITH ALUMINUM

Werner Schmidt, Stuttgart-Vaihingen, Germany

No Drawing. Continuation of application Serial No. 408,590, February 5, 1954. This application November 23, 1955, Serial No. 548,786

Claims priority, application Germany February 23, 1953

5 Claims. (Cl. 23—88)

The present invention relates to an improved chemical manufacturing process using sodium silicofluoride and aluminum as base or primary materials.

It is known to use sodium silicofluoride alone or in conjunction with alkali chlorides or cryolite as purifying and degassing media in aluminum melts. The elimination of gases and impurities, mainly aluminum oxide, proceeds according to the following formula:

$$3Na_2SiF_6 + Al \rightarrow Na_3AlF_6 + 3Na + 3SiF_4 \quad (1)$$
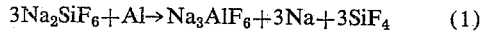

It is also known to produce a double fluoride of sodium and aluminum, which is similar to chiolite and has been designated as artificial cryolite mixed with aluminum fluoride, by reacting aluminum with sodium silicofluoride. This reaction is based upon the following chemical equation:

$$3Na_2SiF_6 + 4Al \rightarrow 6NaF + 4AlF_3 + 3Si \quad (2)$$
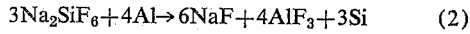

In this known process, it is proposed intimately to mix the reaction components and, if desired, to exclude air.

In accordance with the present invention, considerably improved results are obtained by substantially completely excluding water vapors from the reaction.

Among the advantages obtained thereby are the following:

(1) The reaction proceeds more calmly and there is no spattering of the reaction mixture.

(2) The acrid fumes of the conventional process, consisting of $SiF_4$ and HF, are substantially eliminated.

(3) The salt obtained by the process is more liquid.

(4) The melting point of the salt is below 720° C., i. e. at least 50° C. lower than that of the salt obtained by the known process.

It is particularly advantageous to effect the process in accordance with the invention with the reaction components being intimately intermixed. This will avoid premature decomposition of the sodium silicofluoride to a large degree.

The reaction will proceed at temperatures between 660° and 1100° C. If desired, superatmospheric pressures up to 500 atmospheres may be used and it is preferred to work in the absence of earth alkali metals.

As is well known, chiolite and its eutectic are very desirable conducting and refining media in the entire aluminum industry and their price, compared to the alkali chlorides which are also used for such purposes, is rather high.

Thus, the process of the present invention makes it possible to obtain the double fluoride of sodium and aluminum, which is very similar to chiolite, from the comparatively cheap sodium silicofluoride under improved conditions, which make the process commercially feasible. The similarity of chiolite and the salt obtained in this process becomes obvious when the following data are compared:

(1) Both have the same components, namely NaF and $AlF_3$;

(2) The components are present in similar proportions, namely $3AlF_3 \cdot 5NaF$ in chiolite and $4AlF_3 \cdot 6NaF$ in the novel composition;

(3) The melting point of chiolite is 725° C. and the melting point of the double fluoride obtained in the process according to the invention is about 700° C.; and (4) Both substances have about the same absorption or dissolution capacity for aluminum oxide.

It is a major advantage of the process of the present invention that the reaction proceeds quantitatively if the reaction conditions are observed, which makes it possible to obtain aluminum-silicon alloys of predetermined aluminum-silicon ratio if a pre-calculated excess amount of aluminum is used in the process. If this is done, the comparatively inexpensive sodium silico-fluoride and aluminum will react together to produce a double fluoride of sodium and aluminum similar to chiolite which is considerably more expensive than the base material salt and an aluminum-silicon alloy which is also more valuable than elementary aluminum.

As the reaction Formula 2 shows, three mols of $Na_2SiF_6$ and four atom-grams of aluminum are needed to produce 3 atom-grams of silicon in addition to the salt.

Thus, if 107.88 g. (4 atom-grams) of aluminum are reacted with 564.15 g. (3 mols) of $Na_2SiF_6$ in accordance with the invention, six mols of NaF and four mols of $AlF_3$, totalling 587.9 g. of the chiolite-like salt and 84.18 g. (3 atom-grams) of silicon are obtained.

If an excess of aluminum, i. e. more than four atom-grams of aluminum per three mols of sodium silicofluoride, is used in the process of the invention, a silicon-aluminum alloy instead of elementary silicon is produced. In view of the quantitatively proceeding reaction, it is obvious that the Al-content in the alloy can be adjusted to any desired amount if the excess of aluminum is chosen accordingly. If this excess is big enough, the aluminum will exceed 50% in the alloy which will then be an aluminum-silicon alloy.

Thus, the process of the present invention is of exceptional economic value, in that it results in a valuable salt which is very similar to chiolite and, as a by-product so to say, industrially very useful aluminum-silicon alloys may be obtained at the same time.

The intimate mixture between the sodium silicofluoride and aluminum has conventionally been accomplished in various ways, among which are the following:

(a) The salt and the metal are mixed together in powdered form at room temperature;

(b) The powdered salt and metal are intermixed at elevated temperature but below the melting point of aluminum (658° C.);

(c) The salt and metal are mixed as under (a) or (b) above, and the powder mixture is subsequently briquetted in a conventional briquetting apparatus under pressures between 100 and 1000 atmospheres;

(d) Aluminum is heated to a temperature above 500° C., when it becomes brittle, while being mechanically agitated. This may be accomplished, for instance, by heating the aluminum in a rotary furnace or by heating it in a furnace which is agitated. This will lead to the comminution of the aluminum into individual crystals and the crystalline aluminum powder may then be mixed with powdered sodium silicofluoride as under (a) or (b).

The above methods are not sufficient, however, to obtain the most favorable results of intimate intermixture and the following method is proposed for this purpose:

(e) Aluminum is melted in a crucible, preferably of coal, graphite or silicon carbide. Sodium silicofluoride powder is introduced into the melt, which must have a temperature above 700° C., in such manner that it is immediately finely distributed in the molten mass. This may be done by injecting the salt powder into the metal melt by a device similar to conventional sandblasting equipment. Alternatively, the powder is continuously or in batches pressed beneath the melt surface under strong agitation, the admixture of the powder being so apportioned and limited that no spontaneous decomposition of sodium silicofluoride with the simultaneous creation of silicon fluoride occurs. It is also possible to introduce the salt powder into a casting jet of molten aluminum having a temperature above 700° C. The jet will carry the sodium silicofluoride powder with it and the powder will be further mixed with the aluminum when the jet hits a container therebelow.

A particularly intimate mixture of sodium silicofluoride and aluminum is obtained if procedure (e) is modified as follows: a mixture of aluminum fluoride powder and sodium silicofluoride powder is introduced into an aluminum melt in accordance with method (e) and is thoroughly distributed therein.

If the sodium silicofluoride and aluminum are intermixed in accordance with procedures (a) to (d), above, the reaction then proceeds at temperatures between 660 and 1100° C. In procedure (e), the reaction takes place during distribution of the salt powder in the molten aluminum.

Water vapor may be excluded from the reaction in the following manner:

(A) Removal of moisture from sodium silicofluoride by (1) treating it under vacuum and at room temperature in a vessel, preferably under agitation, or in a rotating drum; (2) treating it under vacuum as in (1) but at a temperature of 200–300° C.; or (3) treating it as in (2) but under atmospheric pressure.

(B) Atmospheric water vapors may be excluded from the reaction by (1) heating the reaction vessel from the outside by means of gas, oil, coaldust or coke and covering the vessel with a closure of graphite, ceramic or iron, and (2) more effectively, by electrical heating, either resistance heating from the outside or inductive heating of the aluminum. In this case, too, the vessel may be covered as in (1) and in both cases, it is preferred to improve the exclusion of air and moisture by blowing an inert, dry gas into the vessel, such as nitrogen, argon or helium.

The manufacturing process of this invention will be illustrated by the following examples although it should be clearly understood that these examples in no way limit the scope of the invention, as defined in the appended claims.

*Example I*

100 kg. of an Al-Si eutectic alloy with a content of 12.5 kg. of silicon were produced, in addition to the salt which is similar to chiolite.

In accordance with reaction Formula 2, 16.02 kg. of aluminum and 83.77 kg. of $Na_2SiF_6$ will produce 12.5 kg. of silicon. Thus, to obtain the desired alloy, there is needed an excess of 87.5 kg. of aluminum in the reaction mixture.

In accordance with the above, 103.52 kg. of aluminum were melted in a graphite crucible and brought to a temperature of about 900° C. 83.77 kg. of sodium silicofluoride powder was then blown into the salt under exclusion of moisture and air during a period of about 15 minutes. The salt melt or slag was then separated from the metal alloy melt by ladling or pouring.

*Example II*

100 kg. of an Al-Si alloy with a content of 25% silicon were produced, in addition to the salt which is similar to chiolite.

According to reaction Formula 2, 167.54 kg. of $Na_2SiF_6$ and 107.04 kg. of aluminum are needed to produce the above alloy. Of the total weight of aluminum, 32.04 kg. of Al are required to free the silicon and 75 kg. of Al are needed to form the alloy.

The above amounts of salt and metal were reacted in the same manner as described in Example I.

*Example III*

The process of Example I was modified in the following manner:

83.77 kg. of sodium silicofluoride were intimately mixed with 16.02 kg. of aluminum powder. The remaining quantity of aluminum required in the process (87.5 kg.) was melted in a graphite crucible and brought to a temperature of about 900° C.

The $Na_2SiF_6$-Al powder mixture was then blown into the aluminum melt and the reaction continued as described in Example I.

If the aluminum used in the reaction contains magnesium, the latter is substantially completely removed during reaction in accordance with the following equation:

$$Na_2SiF_6 + 3Mg \rightarrow 2Na + Si + 3MgF_2 \qquad (3)$$

The elementary sodium which is freed in the above reaction may have a refining effect on any eutectic aluminum-silicon alloy which may be present.

Impurities in the base reaction materials do not generally interfere with the process and the desirability of their absence depends largely on the intended use of the end products. Preferably, the base materials should be free of earth alkali metals to avoid possibly undesirable contamination of the end products.

Also, if the double fluoride of sodium and aluminum is to be used as a solvent for aluminum oxide during aluminum electrolysis, or as slagging or protective agent in the melting and casting of aluminum, the sodium silicofluoride should preferably have a purity of 98–99%. More particularly, its iron content should not exceed 0.3%.

Sodium silicofluoride and other complex fluorides may be advantageously used to remove earth alkali metals from aluminum alloys, as will appear from Equation 3. Thus, it is possible to couple the processes of magnesium removal and production of the chiolite-like salt. This, however, will result in the admixture of magnesium fluoride in the salt.

Earth alkali metals may be removed from aluminum also by the following methods:

(1) Oxidation with air or oxygen-evolving substances, such as nitrates, or with halogens, such as chlorine, and sulfur.

(2) By exchange of ions (metal slag reactions), treating aluminum melts with salts which contain a metal as cation which is nobler than the earth alkali metals, i. e. aluminum, silicon, zinc, iron, copper, etc.

This is a continuation of my application Serial No. 408,590, filed February 5, 1954, now abandoned.

What is claimed is:

1. A chemical manufacturing process comprising the steps of intimately intermixing sodium silicofluoride and aluminum by forcefully introducing only sodium silicofluoride powder free of aluminum powder into and below the surface of an aluminum melt and simultaneously finely distributing the salt in the melt, pre-treating the sodium silicofluoride to remove moisture therefrom, reacting the intimately intermixed salt and aluminum under substantially complete exclusion of water vapor, atmospheric moisture being excluded from the reaction by heating the reaction mass, blowing an inert, dry gas into the reaction mass during heating, and separating the resultant double fluoride of sodium and aluminum from the rest of the reaction product.

2. A chemical manufacturing process comprising the steps of intimately intermixing sodium silicofluoride and aluminum by forcefully introducing only sodium silicofluoride powder free of aluminum powder into and below the surface of an aluminum melt and simultaneously finely distributing the salt in the melt, removing moisture from the sodium silicofluoride by treating it under agitation at a temperature between 200° and 300° C. before introducing it into the aluminum melt, reacting the intimately intermixed salt and aluminum under substantially complete exclusion of water vapor, atmospheric moisture being excluded from the reaction by heating the reaction mass, and separating the resultant double fluoride of sodium and aluminum from the rest of the reaction product.

3. Chemical manufacturing process as defined in claim 1, wherein the starting materials are substantially free of any earth alkali metal.

4. Chemical manufacturing process as defined in claim 3, wherein the sodium silicofluoride has a purity of at least 98% and contains at most 0.3% of iron.

5. The process of claim 1, wherein the atmospheric moisture is excluded by electrically heating the reaction mass.

References Cited in the file of this patent
UNITED STATES PATENTS

| | | |
|---|---|---|
| 1,464,625 | Pacz | Aug. 14, 1923 |
| 1,518,872 | Pacz | Dec. 9, 1924 |
| 2,607,674 | Winter | Aug. 19, 1952 |

OTHER REFERENCES

Baker's Analyzed C. P. Chemicals and Acids, January 1, 1935, p. 122.

Baker's Analyzed Reagents, April 1954, page 190. Both editions published by J. T. Baker Chemical Co., Phillipburg, N. Y.